US006760536B1

(12) United States Patent
Amir et al.

(10) Patent No.: US 6,760,536 B1
(45) Date of Patent: Jul. 6, 2004

(54) FAST VIDEO PLAYBACK WITH AUTOMATIC CONTENT BASED VARIABLE SPEED

(75) Inventors: Arnon Amir, Cupertino, CA (US); Dragutin Petkovic, Saratoga, CA (US); Dulce Beatriz Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/572,136

(22) Filed: May 16, 2000

(51) Int. Cl.[7] .............................................. H04N 5/91
(52) U.S. Cl. ...................... 386/68; 386/111; 386/112
(58) Field of Search .......................... 386/46, 68, 70, 386/71, 111, 112, 109; 348/700

(56) References Cited

U.S. PATENT DOCUMENTS

| | | | | |
|---|---|---|---|---|
| 4,969,039 A | | 11/1990 | Koga et al. ................. 358/335 |
| 5,282,049 A | | 1/1994 | Hatakenaka et al. ........ 358/335 |
| 5,521,841 A | | 5/1996 | Arman et al. ............ 364/514 A |
| 5,535,008 A | * | 7/1996 | Yamagishi et al. ......... 386/109 |
| 5,606,655 A | | 2/1997 | Arman et al. ............... 395/140 |
| 5,708,767 A | | 1/1998 | Yeo et al. ................... 395/140 |
| 5,751,378 A | | 5/1998 | Chen et al. ................. 348/700 |
| 5,754,728 A | | 5/1998 | Nakajima et al. ............. 386/68 |
| 5,767,923 A | | 6/1998 | Coleman, Jr. ............... 348/700 |
| 5,771,335 A | | 6/1998 | Lee ............................. 386/111 |
| 5,991,502 A | * | 11/1999 | Kawakami et al. ......... 386/109 |

OTHER PUBLICATIONS

Boreczky, John S. and Lawrence A Rowe, "Comparison of Video Shot Boundary Detection Techniques," Computer Science Division—EECS, University of California Berkeley.

Wilf, Itzhak, "Computer, Retrieve for Me the Video Clip of the Winning Goal," *Advanced Imaging*, Aug. 1998, pp. 53–55.

* cited by examiner

*Primary Examiner*—Huy Nguyen
(74) *Attorney, Agent, or Firm*—Lacasse & Associates, LLC; Randy W. Lacasse; Mark C. McCabe, Esq.

(57) ABSTRACT

Browsing of digital video data is performed using a fast forward or fast reverse play mode. The digital video is analyzed and processed to produce a content-based variable-rate video playback sequence for fast browsing. To create the playback sequence, each shot in a video is sped-up at a relatively slow rate at the beginning of the shot by selecting many frames and then the speedup rate is increased as the shot progresses by selecting progressively fewer frames. This method and apparatus of variable-rate frame selection can be used to add and index to a video, play an original video in fast forward/backward mode or to create a new video—a fast forward playback video summary.

46 Claims, 10 Drawing Sheets

| d = 1.40 | d = 1.1041 | d = 1.07 |
|---|---|---|
| Save frame: 2 | Save frame: 2 | Save frame: 2 |
| Save frame: 3 | Save frame: 3 | Save frame: 3 |
| Save frame: 5 | Save frame: 4 | Save frame: 4 |
| Save frame: 7 | Save frame: 5 | Save frame: 5 |
| Save frame: 10 | Save frame: 6 | Save frame: 6 |
| Save frame: 14 | Save frame: 7 | Save frame: 7 |
| Save frame: 20 | Save frame: 8 | Save frame: 8 |
| Save frame: 28 | Save frame: 9 | Save frame: 9 |
| Save frame: 40 | Save frame: 10 | Save frame: 10 |
| Save frame: 56 | Save frame: 12 | Save frame: 11 |
| Save frame: 79 | Save frame: 14 | Save frame: 12 |
| Save frame: 111 | Save frame: 16 | Save frame: 13 |
| Save frame: 156 | Save frame: 18 | Save frame: 14 |
|  | Save frame: 20 | Save frame: 15 |
|  | Save frame: 23 | Save frame: 17 |
|  | Save frame: 26 | Save frame: 19 |
|  | Save frame: 29 | Save frame: 21 |
|  | Save frame: 33 | Save frame: 23 |
|  | Save frame: 37 | Save frame: 25 |
|  | Save frame: 41 | Save frame: 27 |
|  | Save frame: 46 | Save frame: 29 |
|  | Save frame: 51 | Save frame: 32 |
|  | Save frame: 57 | Save frame: 35 |
|  | Save frame: 63 | Save frame: 38 |
|  | Save frame: 70 | Save frame: 41 |
|  | Save frame: 78 | Save frame: 44 |
|  | Save frame: 87 | Save frame: 48 |
|  | save frame: 109 | save frame: 52 |
|  | Save frame: 120 | Save frame: 56 |
|  | Save frame: 133 | Save frame: 69 |
|  | Save frame: 147 | Save frame: 65 |
|  | Save frame: 163 | Save frame: 70 |
|  | Save frame: 180 | Save frame: 75 |
|  | Save frame: 199 | Save frame: 81 |
|  |  | Save frame: 87 |
|  |  | Save frame: 94 |
|  |  | Save frame: 101 |
|  |  | Save frame: 109 |
|  |  | Save frame: 117 |
|  |  | Save frame: 126 |
|  |  | Save frame: 135 |
|  |  | Save frame: 145 |
|  |  | Save frame: 156 |
|  |  | Save frame: 167 |
|  |  | Save frame: 179 |
|  |  | Save frame: 192 |

FAST VIDEO PLAYBACK WITH AUTOMATIC CONTENT BASED VARIABLE SPEED

BACKGROUND OF THE INVENTION

1. Field of Invention

The present invention relates generally to the field of digital video processing. More specifically, the present invention relates to a playback mode for digital video data. This invention has particular application to producing a content-based, variable-rate, digital video playback mode.

2. Discussion of Prior Art

In general, when discussing video content, a frame is a single, discrete video event; a shot is an unbroken sequence of frames from a single camera; and a scene is a collection of one or more adjoining shots.

Browsing video information to identify and select interesting segments of video clips has historically been performed on an edit-capable analog VCR. These analog VCRs allow video browsing and content searching usually through a fast playback function with the ability to smoothly change frame display rates.

Providing fast forward or fast backward functionality for the playback of digital video has proven to be problematic. Decoding video frames and displaying them at normal speeds is a very computationally demanding process; simply running the decoder a few times faster is not a viable solution for speeding up a digital video playback.

Some early fast forward methods include displaying every $n^{th}$ frame and skipping all intermediate frames, for an arbitrarily pre-selected n, or decoding only I frames in an MPEG encoded video. The following prior art references disclose specific attempts to address the challenges related to fast forward/reverse playback of digital video, but fail to describe a variable-rate fast digital video playback functionality which changes the speed-up rate based on the content of the video frames.

The patent to Koga et al. (4,969,039) describes a method of reducing storage space for video data by dividing a video into foreground (moving portion) and background (stationary portion) and storing the background infrequently. A varying playback rate, however, for these two different portions is not discussed.

The patent to Hatakenaka et al. (5,282,049) provides a method of recording digital video data on a DAT tape to speed-up reproduction time. The described method appears directed to reducing reproduction time when making copies, not speeding up video during playback.

The patents to Arman et al. (5,521,841 and 5,606,655) teach a video browsing method which statically displays video frames associated with scene transitions, allows a user to select a frame, and then plays the video starting from that frame.

The patent to Yeo et al. (5,708,767) provides for analyzing a video into a hierarchical graph of scenes and shots so that a user can browse the video by traversing the graph.

The patent to Chen et al. (5,751,378) describes a method of using luminance variation between frames to detect scene changes; however, varying a playback rate based on this scene information does not appear to be provided for.

The patent to Nakajima et al. (5,754,728) provides for a method for fast video player. Frames are skipped based on the amount of motion between frames, so that frames with low amounts of motion are played faster than frames with high amounts of motion. However, this reference does not consider the frame's distance from the shot first frame for changing the rate at which frames are selected. Increasing the speedup ratio along the shot is not considered.

The patent to Coleman, Jr. (5,767,923) provides for a video segment indexing method which relies on frame spatial information to detect scene cuts in video signals but fails to use this scene information to affect a video playback rate.

The patent to Lee (5,771,335) provides for a MPEG fast forward/reverse method which uses an index of all I frames to speed video transmission in a video-on-demand environment.

The article by Itzhak Wilf entitled "Computer, Retrieve for Me the Video Clip of the Winning Goal" describes a video indexing and searching method which analyzes video content to select frames of interest.

The article by John S. Borecsky and Lawrence A. Rowe entitled "Comparison of Video Shot Boundary Detection Techniques" compares and contrasts the various algorithms for detecting video scene changes.

Whatever the precise merits, features and advantages of the above cited references, none of them, individually or in combination, achieve or fulfill the purposes of the present invention. Specifically, the prior art fails to provide for a digital video frame selection method which varies the rate at which frames are selected based on the frame's content, and its position within the shot.

SUMMARY OF THE INVENTION

A video stream (e.g. MPEG, MPEG 2, etc.) is first decoded using known software/hardware technology and fed to a frame analysis application. The frame analysis application uses known algorithms, such as the ones discussed in the above-mentioned article by Borecsky and Rowe or patents 4,969,039; 5,767,923; 5,642,239; 5,778,108; and 5,245,436, to locate and mark frames which occur at shot boundaries or which satisfy other segmentation constraints. Some other possible segmentation constraints are identifying and marking frames with or without accompanying audio data and identifying and marking frames which convey advertisements as opposed to program content. The boundary-marked video is then forwarded to a frame selection method which is the focus of the present invention. Frames selected during this innovative method are then either fed to an MPEG or other video format encoder which creates a new video of just the selected frames or fed to a player that plays the selected frames as a fast forward (or fast reverse) representation of the original video.

One innovative aspect of the present invention is the selecting of frames in such a way that the resulting output video has a non-linear speed-up rate in any given shot; slower at the beginning of a shot, and increasingly faster as the shot progresses. In other words, less frames are skipped nearer the beginning of a shot than are skipped near the middle or the end of a shot. The selected frames are used to either play the original video in a fast forward/backward mode or to create a new video—a fast forward playback video summary. The present invention also contemplates the resulting output video being in the same video format as the input video or in a different format. Another use for the fast video playback is as a browsing tool of the original video. It can be used by local and remote networked users and over the Internet as a video preview because of its dramatically reduced bit rate. Also, using the video summary in a video database allows less storage space to be used and allows for quicker searching and retrieval of video clips.

DESCRIPTION OF THE PREFERRED EMBODIMENTS

While this invention is illustrated and described in a preferred embodiment, the method may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

The following detailed descriptions of various video processing steps use MPEG as an exemplary video format. However, any digital video format that allows for sequential individual frame access or arbitrary frame access is also considered within the scope of the present invention. Some functionally equivalent industry standards include, but are not limited to, MPEG-2, DV (Sony), QuickTime, AVI, RealVideo, H.263 and H.261.

The discussion of the present invention is made generally with regards to a frame speed-up rate. It should be noted that while generally discussed from the viewpoint of a frame speed-up rate, it is equally applicable to view the present invention from the point of a frame selection rate. As is apparent to one of skill in the art, frame speed-up rate is inversely proportional to frame selection rate. As the frame selection rate increases i.e. more frames are selected for viewing, storing, or indexing, the frame speed-up rate decreases, as there are more frames to be viewed, stored, or indexed between a given time period.

Processing and analyzing digital video data has recently attracted a lot of attention because of the interest in indexing and searching vast databases of video information to aid in quickly retrieving desired pictorial information. One capability that is particularly useful in processing large amounts of video data is that of a fast forward/backward video playback function. This capability, which is somewhat common on analog VCRs, is not a straightforward function when handling digital video data. Digital video formats are most adequate for sequential, real-time playback. However, fast forward/reverse playback requires frame skipping. Algorithms which arbitrarily skip a fixed number of frames or skip all MPEG frames except I frames (e.g. skip B and P frames) have been proposed e.g. U.S. Pat. No. 5,771,335. These solutions, however, are rigidly applied to all video segments regardless of content and frequently lose information a user needs when browsing a video. Even when information is not lost, it is often being presented for inappropriate duration (i.e too fast or too slow) for comprehension and efficient browsing.

When a user watches a video, it takes him a short period of time to perceive a new shot which is just starting. After this startup time, the user can observe changes in the shot at a much faster speed. On average, 300 milliseconds is an adequate period for allowing a user to observe a shot at a slower speed before increasing the playback speedup rate.

If an entire shot is sped-up to the fast playback rate, like in previous frame skipping algorithms, a user will be unable to follow and discern short shots. The method of the present invention, which is described below, starts the fast video playback slowly at the beginning of a shot and then reaches a final, faster speed-up rate later in the shot. Implementing a frame skipping algorithm this way enables a user to see and perceive even short shots during browsing but still allows maximum speed-up during long shots.

Figure 1:
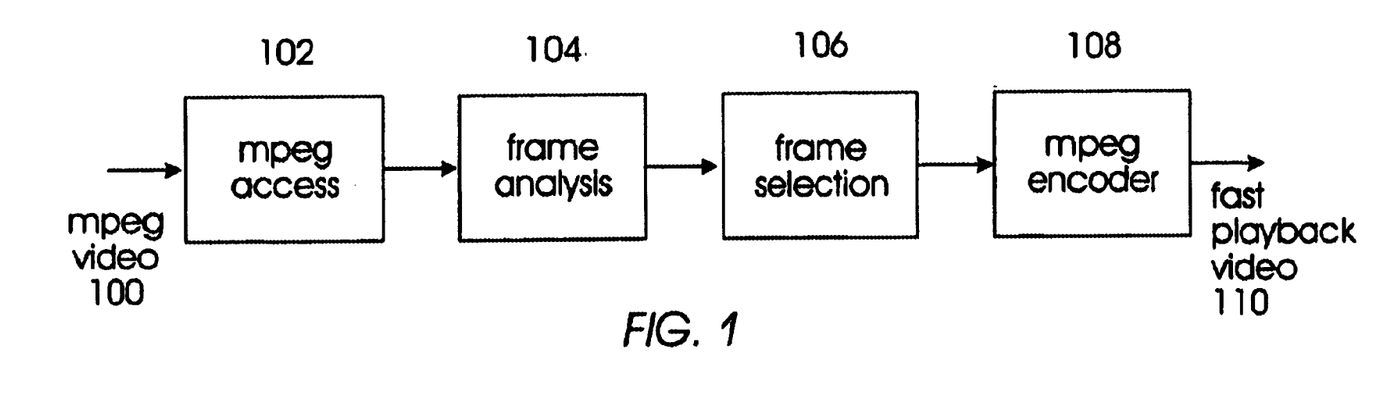
FIG. 1 illustrates a block diagram of the present invention transforming a video stream into a fast playback video.

Three specific examples of applying variable speed-up rates to video shots are provided to further explain the principles of the present invention. A block diagram of the entire process is illustrated in FIG. 1. An MPEG video stream 100 is accessed/decoded by either hardware, software or a combination 102 and processed in frame analysis block 104 to identify which frames comprise shot boundaries. The frame and shot information are then fed to the present invention frame selection method 106 of the invention in order to select those frames which will comprise the fast mode playback sequence. To complete the process, the selected frames are either displayed on an electronic display unit 112(e.g. TV, CRT, LCD, etc.) or fed to MPEG video encoder 108 and stored as a distinct video 110. The present invention contemplates the output video being in the original video format or other equivalent formats such as, but not limited to, those identified earlier.

Figure 2:
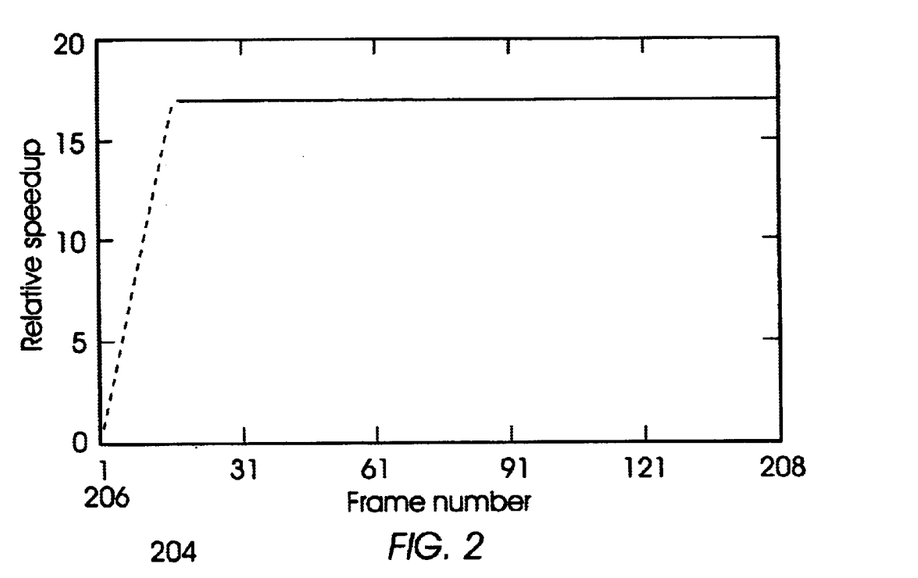
FIG. 2 illustrates a graph representing an accelerating relative frame rate speedup of the present invention which levels off at a maximum value after gradually increasing during the beginning of a video shot.

FIG. 2 represents the relative frame speed-up rate versus the input frame number for a video segment comprising a single shot. The horizontal axis, which represents frame numbers, starts at the beginning of the shot 206 and increases until the last frame 208 is reached. The vertical axis represents the the relative speed-up rate. In this graph the speed-up rate starts near one (i.e. original speed) 210 at the beginning of the shot and gradually increases, in a linear manner, until a maximum speed-up rate 202 is reached. The important feature of the graph is that it illustrates the relationship between speed-up rates at different points in a shot. The earlier a frame is located within a shot, the slower the speedup rate; later frames, however, receive higher speed-up rates. In the example shown, values selected indicate a maximum speedup rate 202 of approximately 17 times the normal speed. This speed is a rate at which a user can comfortably browse a long continuous shot. This maximum speedup rate roughly equates to 1 out of every 17 frames being displayed. There is also some flexibility in selecting how quickly, in other words at what frame number 204, the maximum speedup rate is reached. Typically, a user has sufficiently perceived the start of a shot in the first couple hundreds of milliseconds, which is approximately, for NTSC with a frame rate of 29.97 frames/sec, and without any speedup by frame number 10. Because of the speedup, we reach frame 50 204 of the input video within this short period of time. Initial speed-up rates may vary with differing video formats, original recording quality (e.g. SNR), application, equipment capabilities, or user preferences.

Figure 3:
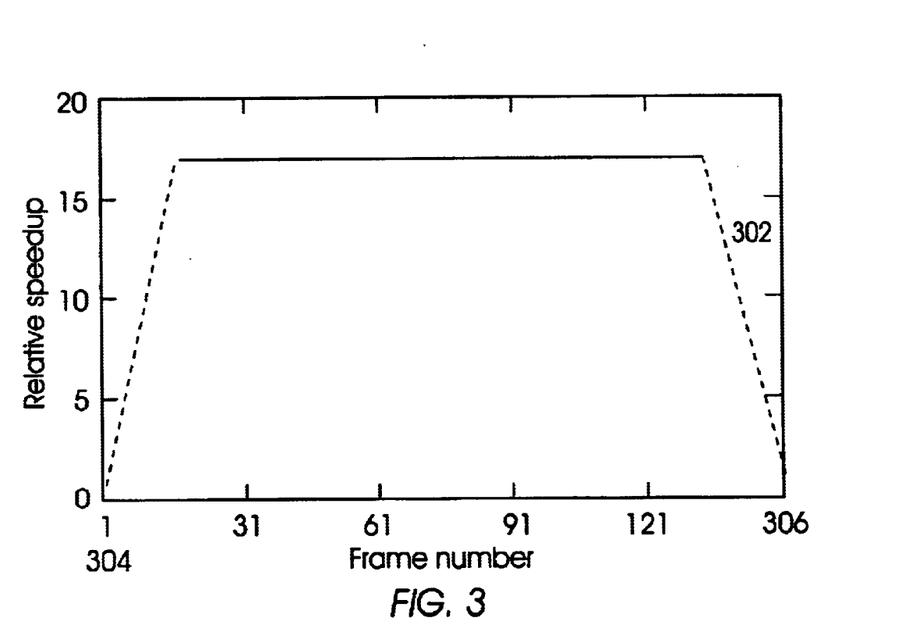
FIG. 3 illustrates a variation of the graph of FIG. 2 in which the relative frame rate speedup gradually decreases as the end of a video shot is approached.

FIG. 3 illustrates a modification to the speedup graph depicted in FIG. 2. In this example, the speedup rate additionally decreases 302 near the end of a shot 306. The benefit of this modification is to allow a browsing user to better perceive the end of a shot as well as the start of a new one. The cost, however, is that the average speed-up rate is slightly less than that of the first frame selection graph. In this second graph, the start and end speedup rates are shown as being mirror images of each other, but dissimilar rates of changing speed-up rates at each of a shot's endpoints are also contemplated without departing from the scope of the present invention.

Figure 4:
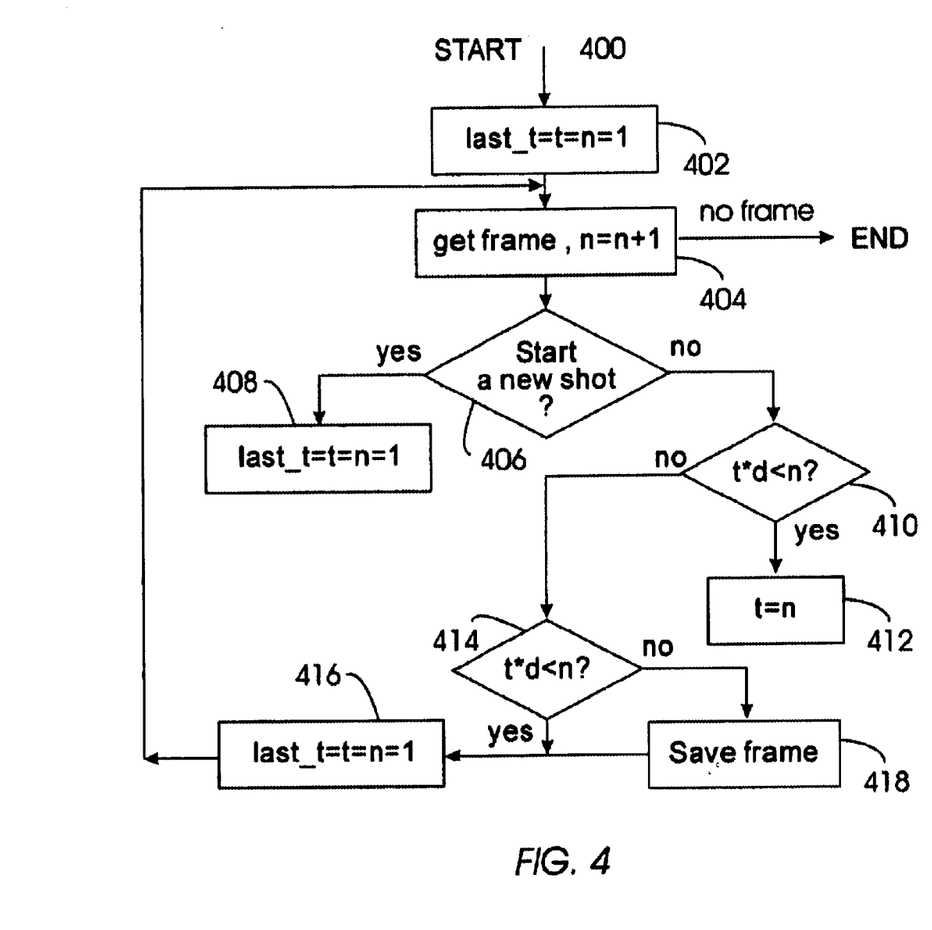
FIG. 4 illustrates a flowchart for implementing a variably increasing, unbounded relative frame rate speedup method of the present invention for selecting frames.

A third method for selecting which frames to include in a fast forward/reverse playback video is illustrated in the flowchart of FIG. 4. In this method the speedup rate is unbounded—the longer the shot is, the faster the rate becomes. The logic of the flowchart selects a frame according to the following rules:

Let n denote the frame number, starting from 1 at the first frame of a new shot/segment, then $$s(1) = t(1) = 1$$
$$t(n) = \begin{cases} n & \text{if } t(n-1) \cdot d < n \\ t(n-1) & \text{else} \end{cases}$$
$$s(n) = \begin{cases} 0 & \text{if } t(n) = t(n-1) \\ 1 & \text{else} \end{cases}$$

Frames which satisfy $s(n)=1$ are selected for inclusion in the fast video playback sequence. In this example, n denotes the sequential frame number from the beginning of a particular shot. The variable d, during an application of this algorithm, is a setting which controls the playback frame speed-up rate. For a higher value of d, the test $$t(n-1) \cdot d < n$$

is satisfied less often and less frames are selected for inclusion in the resulting output video stream. A lower value of d results in more frames being selected for inclusion in the output stream. Therefore, as d increases so does the playback speed-up rate, and as d decreases, the speed-up rate decreases. A value of d=1.1041 provides a slow enough speed-up rate for a user to perceive all needed information at the start of a shot.

The flowchart in FIG. 4 illustrates the logical flow of the above algorithm. This flowchart starts 400 by initializing variables and counters in step 402. Frame counter, n, represents the frame number retrieved by step 404. If the test t·d<n is not satisfied in step 408, then step 406 checks whether or not the end of a shot has been reached and proceeds in getting a next frame if appropriate. Effectively, if the test in step 408 is not satisfied, then the current frame is skipped. If the test in step 408 is satisfied, however, then the value of n is stored as t in step 410 and the frame is sent to output in step 412.

The present invention contemplates, within its scope, variations of the test criteria illustrated in step 408. For example, by replacing the criteria with (t·d<n OR n−t≧15) the present invention bounds the speed-up ratio to be, at most, 15. Other variations include different speed-up ratio ramps and scene motion dependent speed-up (e.g. 15 is replaced by a value which depends on the temporal amount of motion in a scene).

Figure 5:
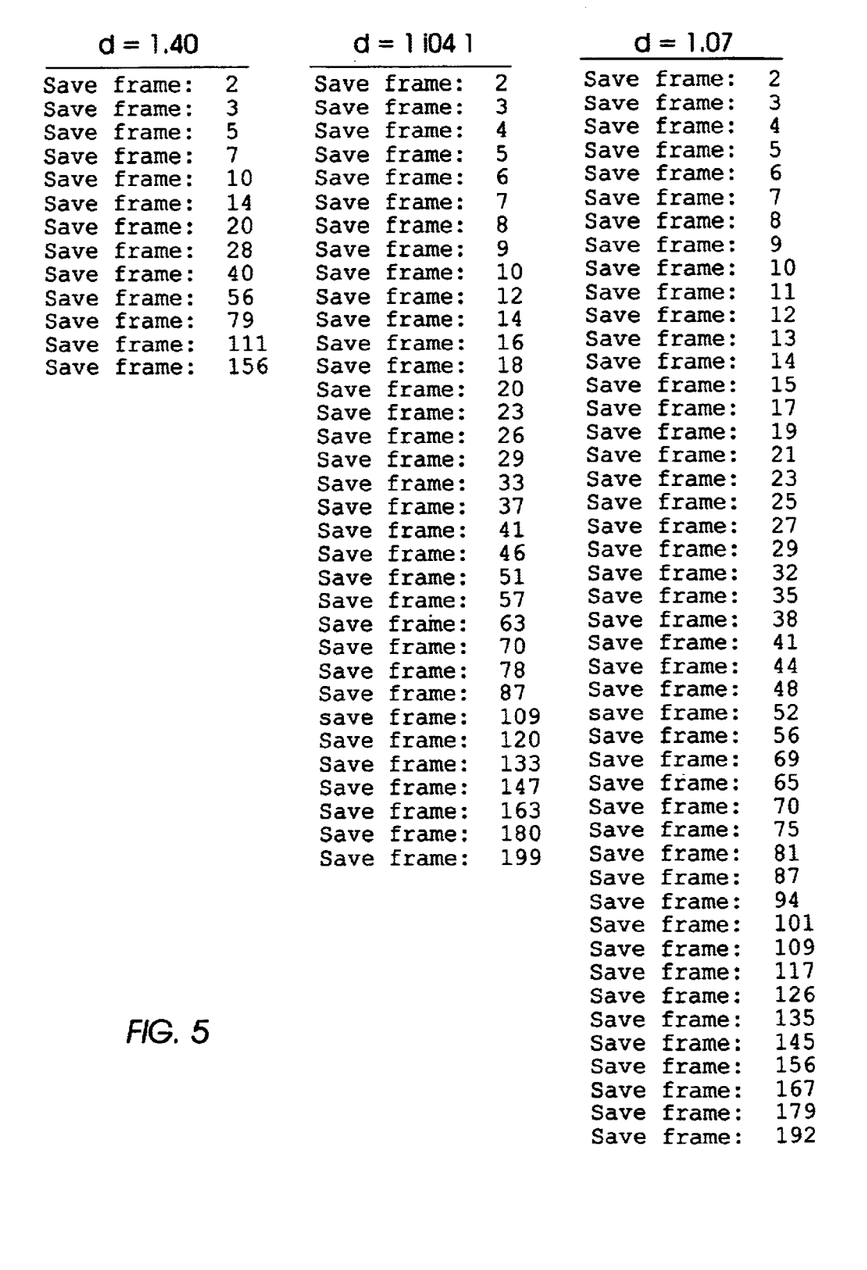
FIG. 5 illustrates a table depicting the frames selected when the flowchart of FIG. 4 is implemented with various values of d.

The table provided in FIG. 5 lists the frame numbers of frames selected by this last algorithm applied to a 200-frame shot using 2 different values of d, d=1.1041 and d=1.2. The choice of d=1.1041 results in the first 10 frames at the beginning of a shot being selected and as the frame number increases, less and less frames are selected resulting in a gradual increase of the fast forward speedup rate. In addition, a secondary table is shown for each value of d which illustrates the effect of limiting the speed-up ratio to at most "10".

Throughout the discussion of the present invention the terms "fast forward" and "fast backward (or reverse)" have often been used interchangeably. Although a specific example of a fast reverse speedup sequence has not been provided, the application of this invention's principles work similarly forwards or backwards. The variable speedup rate is greater farther from a shot boundary and smaller when closer to a shot boundary regardless of whether traveling forwards or backwards in a video sequence. Only the indexing of sequential video frames, which are measured from the shot boundary, needs to be modified depending on which direction the video sequence is traversed.

In general, what has been shown is a method of selecting video frames based on the video content. A slower speed-up rate (few frames skipped) is used near the beginning of a shot and gradually accelerated to a very fast playback rate (many frames skipped) for the remainder of the shot. The present invention also contemplates using this same method of variable-rate content-based video playback with video segmentation rules other than simple detection of shot boundaries. Video sequences which have been segmented to identify frames with no audio allow for a faster playback rate during times of no speech as compared to when speech is occurring. Also, segmentation based on scene classification (e.g. commercials) allows different speedup rates to be applied to program-related frames as compared to commercial-related frames. Frame selection of video streams segmented according to the above rules (i.e. advertisement content or accompanying audio) is performed similar to the frame selection of shot-boundary marked video of the earlier discussed embodiments. Frame analysis process 104 identifies those frames of a video which have accompanying audio data as opposed to those frames which do not. Alternatively, frame analysis process 104 identifies those frames of video which are program related and those which are simply conveying a commercial. In these examples, the inventive frame selection method 106 applies different selection rates according to which classification a video frame is determined to be. The segmentation of frames according to these, or other classifications, is not considered to be an innovative aspect of the present invention, and known video segmentation algorithms such as those discussed in the article by Borecsky and Rowe as well as others are all contemplated by the present invention.

Figure 6:
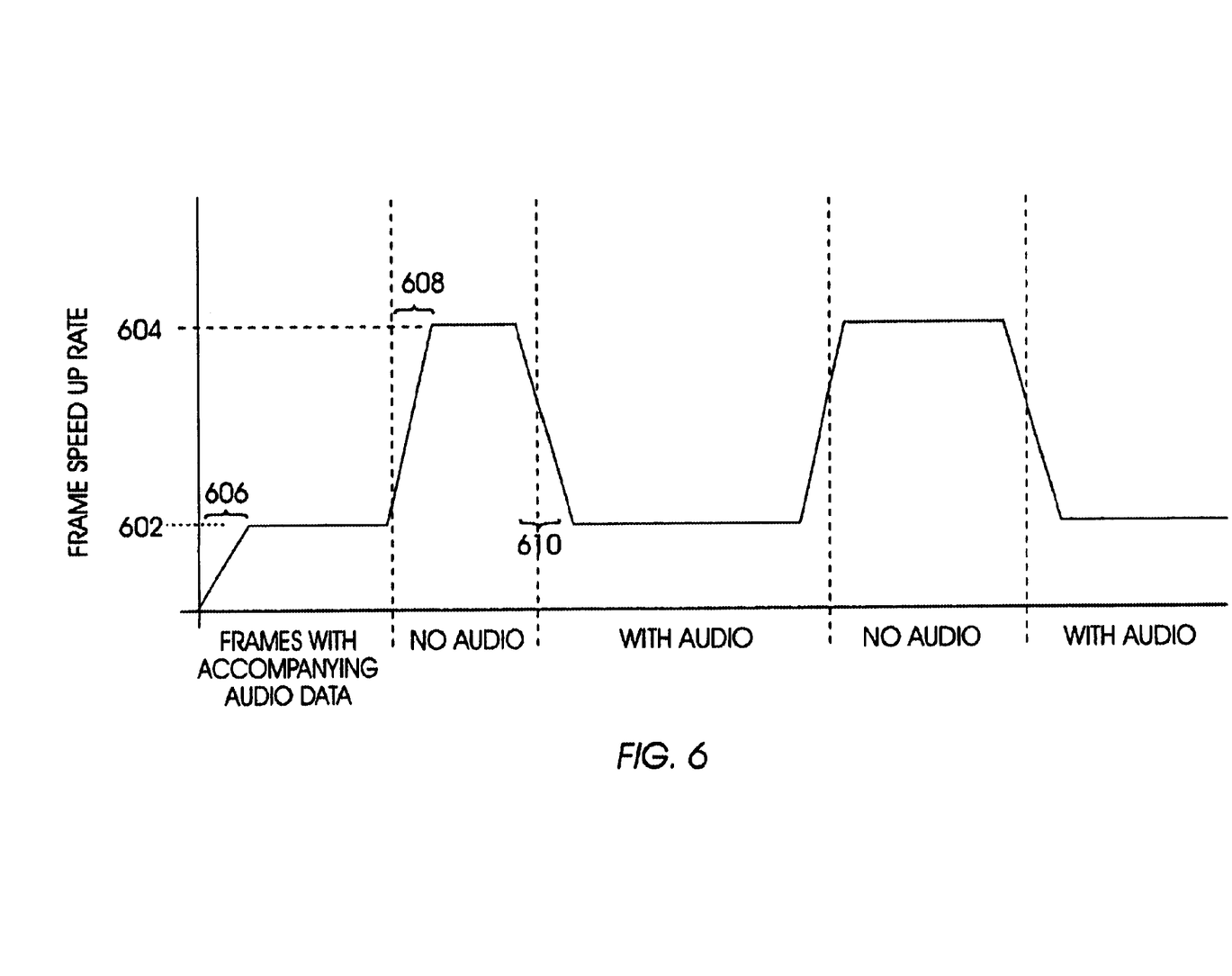
FIG. 6 illustrates a graph representing different speed-up rates applied, according to the present invention, to video frames depending on whether or not the frames convey program information or advertisement information.

FIG. 6 illustrates the application of different selection rates to frames based on whether they are program related or advertisement related. The maximum frame speed-up rate 604 during advertisement shots is illustrated as twice the speed-up rate 602 during program shots. Other ratios of speed-up rates between the two types of shots are also contemplated within the scope of the present invention.

Furthermore, in a preferred embodiment, the acceleration period 608 at the beginning of advertising shots is shorter than the acceleration period 606 at the beginning of program shots. This difference in acceleration times is due to the typically faster shots 610 during commercials (e.g. 1–2 seconds) than the longer shots of news, movies and other programs 612 (e.g. 4–6 seconds). Example values for periods 606 and 608 are 500 ms and 300 ms, respectively.

Figure 7:
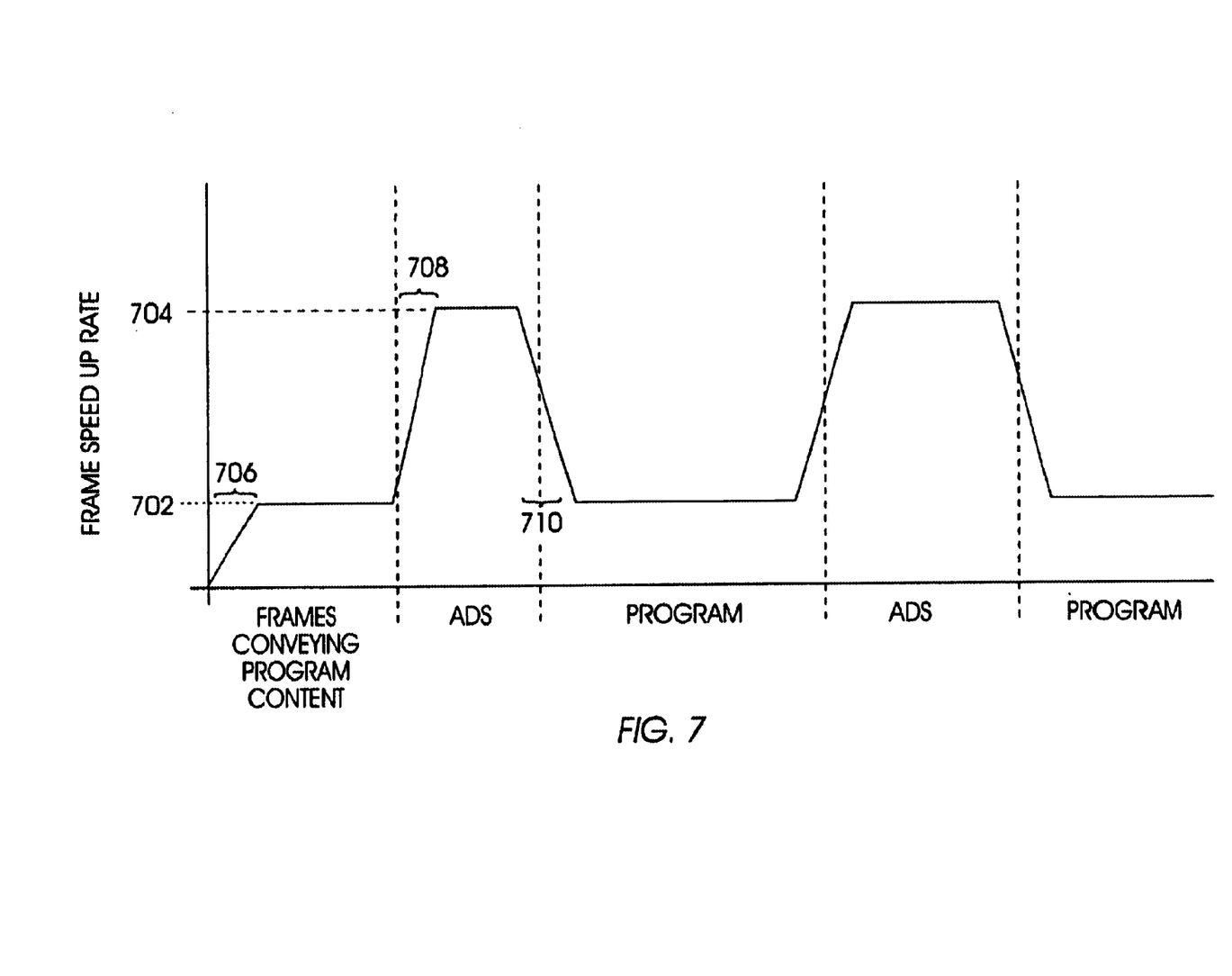
FIG. 7 illustrates a graph representing different speed-up rates applied, according to the present invention, to video frames depending on whether or not the frames have accompanying audio data.
Figure 8:
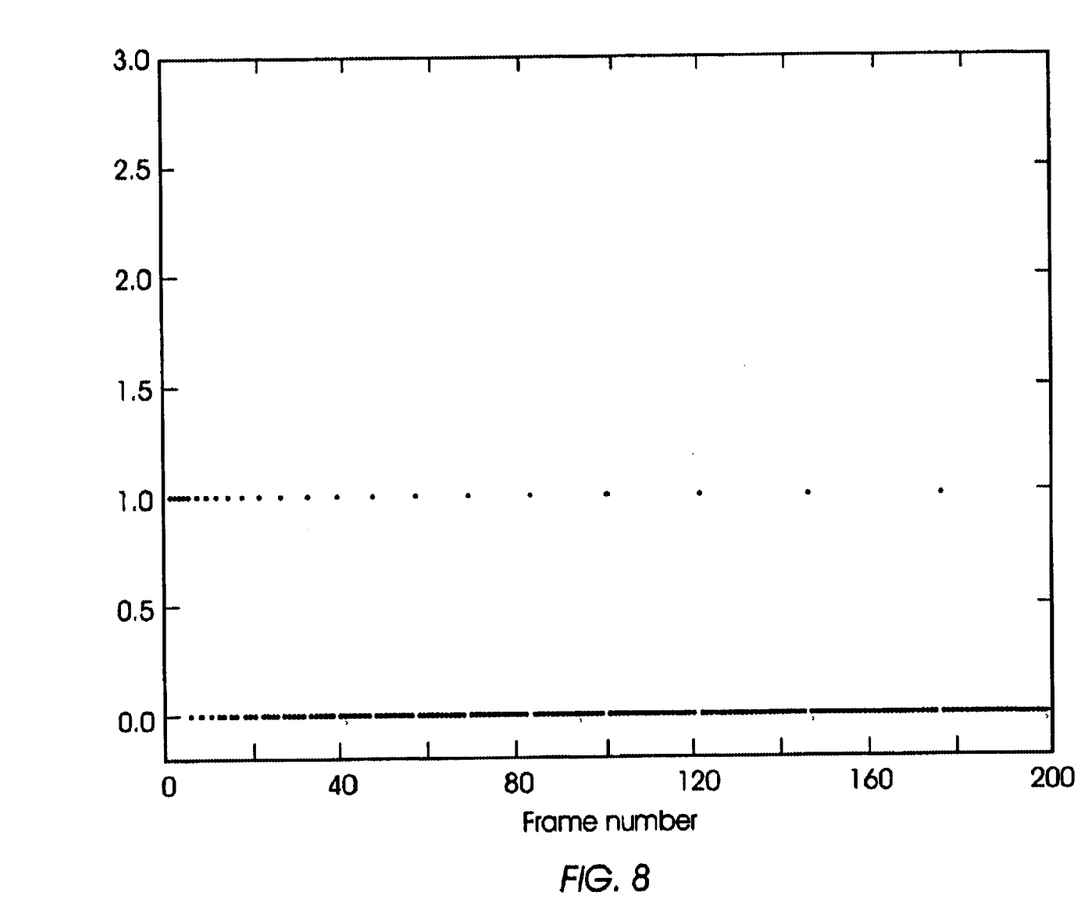
FIGS. 8–11 illustrate a graph of the which frames are selected according to application of the present invention utilizing various values for the system's variable parameters.
Figure 9:
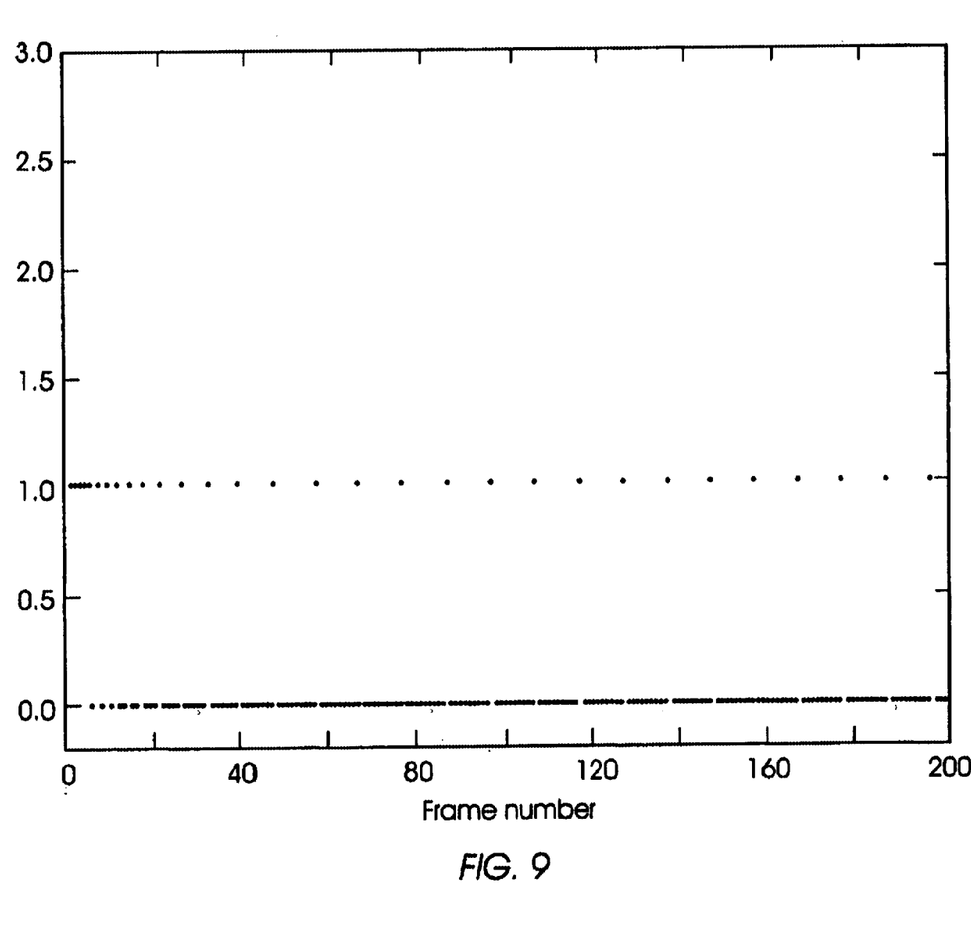
Figure 10:
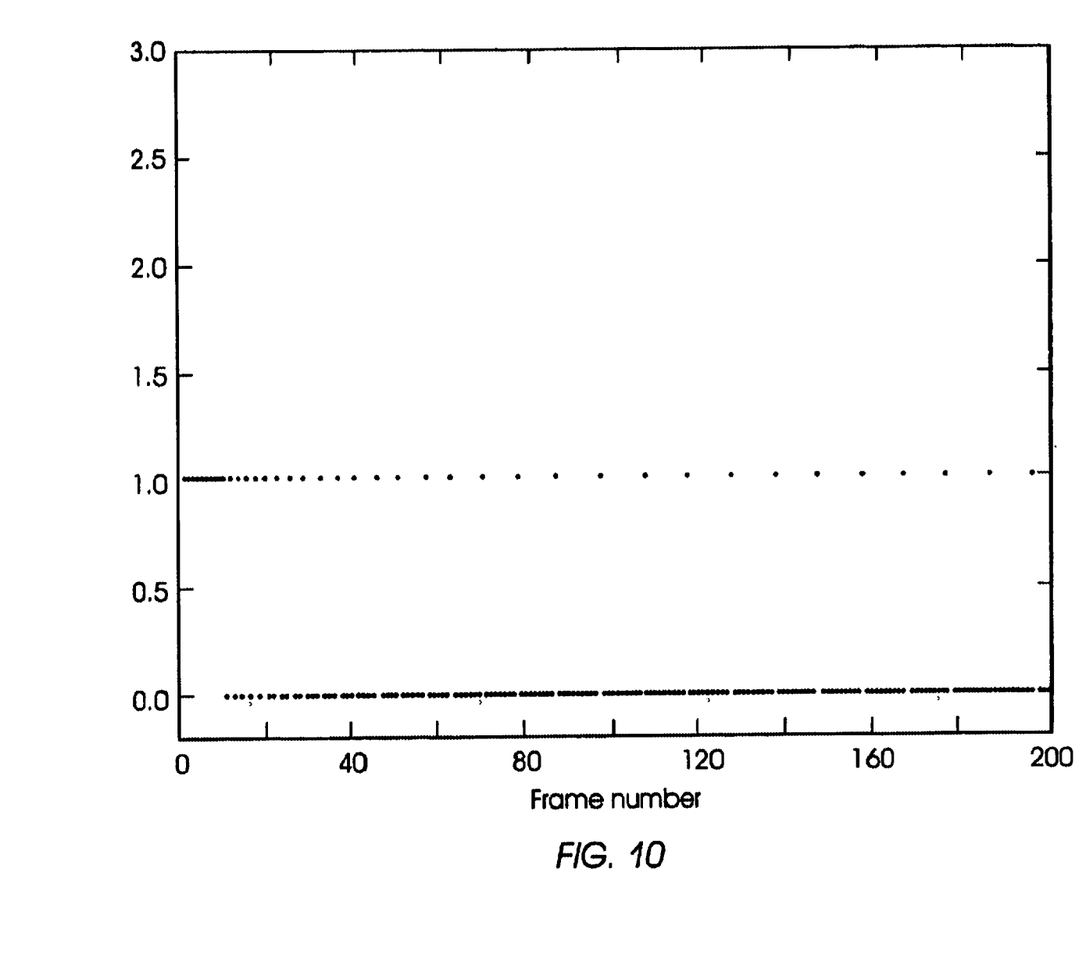
Figure 11:
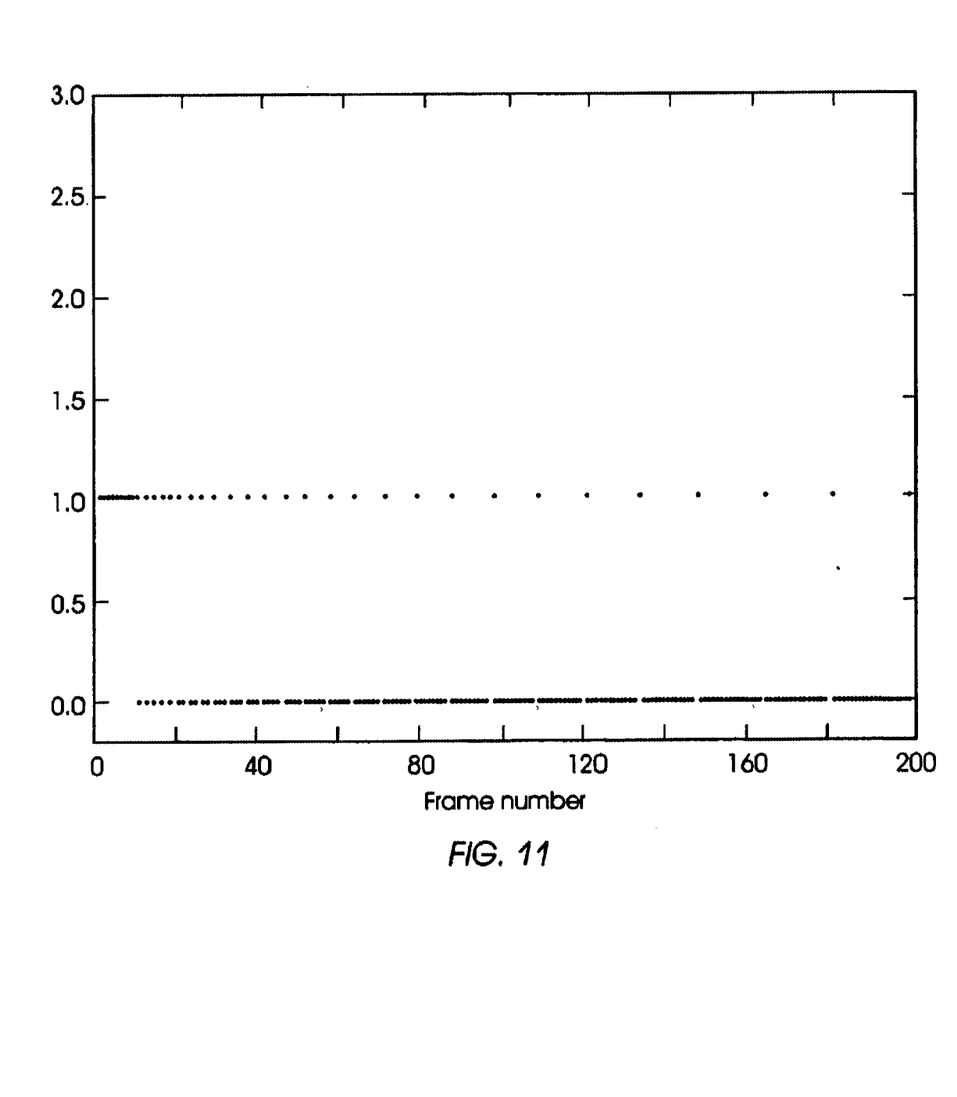

FIG. 7 illustrates another application of the present invention. In this figure, different frame speed-up rates 702 and 704 are applied to frames according to whether or not the frames have accompanying audio data. For those frames having associated audio, the audio can be sped up using known techniques such as those described in the article from *IEEE Transactions on Acoustics, Speech and Signal Processing*, "Time Domain Algorithms for Harmonic Bandwidth Reduction and Time Scaling of Speech Signals"—ASSP-27(2), April 1979, pp. 121–133. It is preferable to apply a slower speed-up rate during portions of the video having associated audio in order to maintain comprehensible sped up audio sequenced with the associated video. It is shown in the article from the Thirty-Third Hawaii International Conference on System Sciences, "Using Audio Time Scale Modification for Video Browsing"—Amir et al., HICSS-2000, Maui, January 2000—that comprehension of audio is not affected at a speedup ratio of up to 1.5 times the original speed. As previously mentioned, many different methods of segmenting frames according to various classifications exist. The previous two figures illustrate examples of different frame speed-up rates applied to the specific segmentation rules of advertising vs. program shots and audio vs. no audio shots. The present invention is not limited to these examples and applying different speed-up rates to frames segmented according to other classification rules is also considered within its scope.

The previously discussed embodiments include a final step of providing a selected frame for display or storing selected frames in a separate fast playback sequence. As an alternative, the present invention, in addition to or instead of the previously discussed output modes, generates an index of the selected video frames. The present invention considers within its scope storage of this index as a separate file as well as the inclusion of such an index in the video frames themselves. Also contemplated within the scope of the present invention is the inclusion of multiple indices added to the video data; each of the indices being generated according to a different segmentation criteria and/or different playback speeds.

FIGS. 8 through 11 have been included to illustrate the effect of varying certain parameters of the present invention's algorithm described earlier with respect to FIG. 4. In particular, each of these figures contain an upper plot, representing selected frames, and a lower plot, representing skipped frames for the values in the following table:

| Figure | Value of d | Test Criteria |
|---|---|---|
| 8 | 1.2 | t · d < n |
| 9 | 1.2 | (t · d < n) OR (n − t ≧ 10) |
| 10 | 1.1041 | t · d < n |
| 11 | 1.1041 | (t · d < n) OR (n − t ≧ 10) |

CONCLUSION

A system and method has been shown in the above embodiments for the effective implementation of a variable-rate content-based fast digital video playback method. While various preferred embodiments have been shown and described, it will be understood that there is no intent to limit the invention by such disclosure, but rather, it is intended to cover all modifications and alternate constructions and implementations falling within the spirit and scope of the invention as defined in the appended claims. For example, the present invention should not be limited by computer platform, computer operating system, digital video format, video display method, video storage method, local or network hardware architecture, e-commerce platform, video access method, video decoding method, video encoding method or video frame analysis, processing and segmentation methods. In addition, the present invention can be implemented locally on a single PC, connected workstations (i.e. networked-LAN), across extended networks such as the Internet or using portable equipment such as laptop computers or wireless equipment (RF, microwaves, infrared, photonic, etc.)

What is claimed is:

1. A method of selecting frames from a sequence of digitally encoded frames containing one or more video shots comprising the steps:
   determining a first frame of a first video shot;
   for each frame in said first video shot, determining a frame selection rate dependent on a frame's distance from said first frame, and
   selecting a plurality of frames from said first video shot according to said frame selection rate.

2. A method of selecting frames from a sequence of digitally encoded frames containing one or more video shots, as per claim 1, wherein said frame selection rate decreases with distance from said first frame of said first video shot.

3. A method of selecting frames from a sequence of digitally encoded frames containing one or more video shots, as per claim 1, wherein said selection rate is substantially 100% at said first frame and decreases linearly in proportion to said frame's distance from said first frame.

4. A method of selecting frames from a sequence of digitally encoded frames containing one or more video shots, as per claim 3, wherein said frame selection rate stops decreasing upon reaching a minimum selection rate.

5. A method of selecting frames from a sequence of digitally encoded frames containing one or more video shots, as per claim 1, further comprising the step:
   combining said plurality of frames to produce a fast mode digital video playback sequence.

6. A method of selecting frames from a sequence of digitally encoded frames containing one or more video shots, as per claim 5, wherein said fast mode is fast forward.

7. A method of selecting frames from a sequence of digitally encoded frames containing one or more video shots, as per claim 5, wherein said fast mode is fast reverse.

8. A method for producing a fast mode digital video playback sequence from a multi-shot video sequence, as per claim 5, wherein said playback sequence is recorded on one of film, tape, computer disk, laser disk, DVD, CD, or semiconductor-based memory.

9. A method for producing a fast mode digital video playback sequence from a multi-shot video sequence, as per claim 5, wherein said playback sequence is stored in one of MPEG, MPEG2, MPEG4, DV (Sony), QuickTime, RealVideo, AVI, H.263 or H.261 format.

10. A method for producing a fast mode digital video playback sequence from a multi-shot video sequence, as per claim 5, wherein said playback sequence is displayed on one of TV, CATV, LCD, CRT, or electronic display.

11. A method of selecting frames from a sequence of digitally encoded frames containing one or more video shots, as per claim 1, further comprising the step:
creating at least one index of said plurality of frames, said at least one index comprising a corresponding entry for each frame in said plurality of frames.

12. A method of selecting frames from a sequence of digitally encoded frames containing one or more video shots, as per claim 11, wherein said at least one index is stored in one of optical, magnetic, or semiconductor storage medium.

13. A method of selecting frames from a sequence of digitally encoded frames containing one or more video shots, as per claim 11, wherein each frame of said plurality of frames is encoded with its said corresponding entry.

14. A method of selecting frames from a sequence of digitally encoded frames containing one or more video shots, as per claim 1, which further comprises the step:
determining a set of frames at an end boundary of said first shot.

15. A method of selecting frames from a sequence of digitally encoded frames containing one or more video shots, as per claim 14, wherein said frame selection rate is less than substantially 100% prior to said set of frames.

16. A method of selecting frames from a sequence of digitally encoded frames containing one or more video shots, as per claim 15, wherein said frame selection rate increases linearly from a first frame of said set of frames to a frame selection rate of substantially 100% at a final frame of said set of frames.

17. A method of selecting frames from a sequence of digitally encoded frames containing one or more video shots, as per claim 16, further comprising the step:
combining said plurality of frames to produce a fast mode digital video playback sequence.

18. A method of selecting frames from a sequence of digitally encoded frames containing one or more video shots, as per claim 17, wherein said fast mode is fast forward.

19. A method of selecting frames from a sequence of digitally encoded frames containing one or more video shots, as per claim 17, wherein said fast mode is fast reverse.

20. A method of selecting frames from a sequence of digitally encoded frames containing one or more video shots, as per claim 16, further comprising the step:
creating at least one index of said plurality of frames, said at least one index comprising a corresponding entry for each frame in said plurality of frames.

21. A method of selecting frames from a sequence of digitally encoded frames containing one or more video shots, as per claim 20, wherein said at least one index is stored in one of optical, magnetic, or semiconductor storage medium.

22. A method of selecting frames from a sequence of digitally encoded frames containing one or more video shots, as per claim 20, wherein each frame of said plurality of frames is encoded with its said corresponding entry.

23. A method for producing a fast mode digital video playback sequence from a multi-shot video sequence comprising the steps:
identifying a first frame of a first video shot, said first video shot comprising a first sequence of frames;
determining a first frame selection rate for each frame in said first sequence of frames, wherein said first frame selection rate varies over a portion of said first video shot according to a frame's distance from said first frame of said first video shot;
identifying a first frame of a second video shot, said second video shot comprising a second sequence of frames;
determining a second frame selection rate for each frame in said second sequence of frames, wherein said second frame selection rate varies over a portion of said second video shot according to a frame's distance from said first frame of said second video shot;
selecting a first plurality of frames from said first sequence of frames according to said first frame selection rate;
selecting a second plurality of frames from said second sequence of frames according to said second selection rate;
combining said first and second pluralities of frames to produce a fast mode digital play back sequence, and
performing one of recording, indexing, displaying or storing said play back sequence.

24. A method for producing a fast mode digital video playback sequence from a multi-shot video sequence, as per claim 23, wherein
said first frame selection rate is substantially 100% at said first frame of said first video shot and decreases linearly until a first specified minimum frame selection rate is reached, and
said second frame selection rate is substantially 100% at said first frame of said second video shot and decreases linearly until a second specified minimum frame selection rate is reached.

25. A method for producing a fast mode digital video playback sequence from a multi-shot video sequence, as per claim 24, wherein said first specified minimum frame selection rate is smaller than said second specified minimum selection rate.

26. A method for producing a fast mode digital video playback sequence from a multi-shot video sequence, as per claim 23, wherein said first video shot has accompanying audio data and said second video shot does not.

27. A method for producing a fast mode digital video playback sequence from a multi-shot video sequence, as per claim 23, wherein said first video shot relates to advertising and said second video shot relates to programming.

28. A method for producing a fast mode digital video playback sequence from a multi-shot video sequence, as per claim 23, wherein said fast mode is fast forward.

29. A method for producing a fast mode digital video playback sequence from a multi-shot video sequence, as per claim 23, wherein said fast mode is fast reverse.

30. A method for producing a fast mode digital video playback sequence from a multi-shot video sequence, as per claim 23, wherein said recording is performed on one of film, tape, computer disk, laser disk, DVD, CD, or semiconductor-based memory.

31. A method for producing a fast mode digital video playback sequence from a multi-shot video sequence, as per claim 23, wherein said storing is performed in one of MPEG, MPEG2, MPEG4, DV (Sony), QuickTime, RealVideo, AVI, H.263 or H.261 format.

32. A method for producing a fast mode digital video playback sequence from a multi-shot video sequence, as per claim 23, wherein said displaying is performed on one of TV, CATV, LCD, CRT, or electronic display.

33. A system for generating a fast mode digital video playback sequence comprising:
a shot analyzer which identifies a first frame of a video shot;

a frame counter which calculates for each frame in said video shot a corresponding distance from said first frame;

a frame-rate selector which determines a frame selection rate for each frame, based on said corresponding distance, and a frame selector which selects a plurality of frames according to said frame selection rate.

34. A system for generating a fast mode digital video playback sequence, as per claim 33, further comprising a graphical display which displays said plurality of frames.

35. A system for generating a fast mode digital video playback sequence, as per claim 34, wherein said graphical display is one of a TV, CATV, LCD, CRT, or electronic display.

36. A system for generating a fast mode digital video playback sequence, as per claim 33, wherein said playback sequence is recorded on one of film, tape, computer disk, laser disk, DVD, CD, or semiconductor-based memory.

37. A system for generating a fast mode digital video playback sequence, as per claim 36, wherein said plurality of frames is stored in one of MPEG, MPEG2, MPEG4, DV (Sony), QuickTime, RealVideo, AVI, H.263 or H.261 format.

38. A system for generating a fast mode digital video playback sequence, as per claim 33, further comprising a frame indexer which constructs an index of said plurality of frames.

39. A system for generating a fast mode digital video playback sequence, as per claim 38, wherein said index is encoded within said plurality of frames.

40. A system for generating a fast mode digital video playback sequence, as per claim 33, wherein said fast mode is one of fast forward or fast reverse.

41. A system for generating a fast mode digital video playback sequence, as per claim 33, wherein said system is implemented locally or remotely on one or more computer-based systems.

42. A system for generating a fast mode digital video playback sequence, as per claim 33, wherein said system is implemented across networks comprising any of LANs, WANs, cellular, Internet or Web-based networks.

43. A system for generating fast mode digital video playback sequence, as per claim 33, wherein said system is implemented in a set top box, a television, a video recorder, or a video card for a computer.

44. A system for generating fast mode digital video playback sequence, as per claim 33, wherein said system is implemented in video camera, a camcorder, or a video editing device.

45. A system for generating fast mode digital video playback sequence, as per claim 33, wherein said system is implemented in hardware, firmware, or programmable gate array (PGA).

46. An article of manufacture comprising a computer user medium having computer readable program code embodied therein which implements constructing a fast mode digital video playback sequence, said constructing comprising the steps:

determining a first frame of a first video shot;

for each frame in said first video shot, determining a frame selection rate dependent on a frame's distance from said first frame, and selecting a plurality of frames from said first video shot according to said frame selection rate.

* * * * *